(12) United States Patent
Zhou et al.

(10) Patent No.: US 12,368,884 B2
(45) Date of Patent: **\*Jul. 22, 2025**

(54) REPRESENTING MOTION VECTORS IN AN ENCODED BITSTREAM

(71) Applicant: Microsoft Technology Licensing, LLC, Redmond, WA (US)

(72) Inventors: You Zhou, Sammamish, WA (US); Sergey Silkin, Nacka (SE); Sergey Sablin, Redmond, WA (US); Chih-Lung Lin, Redmond, WA (US); Ming-Chieh Lee, Bellevue, WA (US); Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,997

(22) Filed: Nov. 28, 2022

(65) Prior Publication Data

US 2023/0086944 A1 Mar. 23, 2023

Related U.S. Application Data

(63) Continuation of application No. 16/779,264, filed on Jan. 31, 2020, now Pat. No. 11,546,629, which is a (Continued)

(51) Int. Cl.
*H04N 7/12* (2006.01)
*H04N 19/43* (2014.01)
(Continued)

(52) U.S. Cl.
CPC .......... *H04N 19/523* (2014.11); *H04N 19/43* (2014.11); *H04N 19/513* (2014.11); *H04N 19/52* (2014.11); *H04N 19/70* (2014.11)

(58) Field of Classification Search
CPC ...... H04N 19/523; H04N 19/52; H04N 19/43; H04N 19/513; H04N 19/70
See application file for complete search history.

(56) References Cited

U.S. PATENT DOCUMENTS 5,436,665 A * 7/1995 Ueno .................. H04N 19/117
375/E7.088
5,532,747 A * 7/1996 Yoon .................. H04N 19/523
375/E7.26

(Continued)

FOREIGN PATENT DOCUMENTS

JP 2006-174014 6/2006
WO WO 2013/154673 10/2013

OTHER PUBLICATIONS

Office Action dated Jul. 31, 2023, from Brazilian Patent Application No. BR112016015618-8, 10 pp.

(Continued)

*Primary Examiner* — Philip P. Dang
(74) *Attorney, Agent, or Firm* — Klarquist Sparkman, LLP

(57) ABSTRACT

A format for use in encoding moving image data, comprising: a sequence of frames including plurality of the frames in which at least a region is encoded using motion estimation; a respective set of motion vector values representing motion vectors of the motion estimation for each respective one of these frames or each respective one of one or more regions within each of such frames; and at least one respective indicator associated with each of the respective frames or regions, indicating whether the respective motion vector values of the respective frame or region are encoded at a first resolution or a second resolution.

17 Claims, 4 Drawing Sheets

Related U.S. Application Data continuation of application No. 15/711,627, filed on Sep. 21, 2017, now Pat. No. 10,587,891, which is a continuation of application No. 14/530,625, filed on Oct. 31, 2014, now Pat. No. 9,774,881.

(60) Provisional application No. 61/934,506, filed on Jan. 31, 2014, provisional application No. 61/925,108, filed on Jan. 8, 2014.

(51) Int. Cl.
  *H04N 19/513* (2014.01)
  *H04N 19/52* (2014.01)
  *H04N 19/523* (2014.01)
  *H04N 19/70* (2014.01)

(56) References Cited

U.S. PATENT DOCUMENTS

| | | | | |
|---|---|---|---|---|
| 5,768,537 | A * | 6/1998 | Butter | H04N 19/423 382/250 |
| 6,301,299 | B1 * | 10/2001 | Sita | H04N 19/176 348/715 |
| 6,330,344 | B1 * | 12/2001 | Kondo | G06T 3/4023 348/E7.016 |
| 6,466,624 | B1 * | 10/2002 | Fogg | H04N 19/42 375/240.29 |
| 6,473,462 | B1 * | 10/2002 | Chevance | H04N 5/144 348/E5.065 |
| 6,611,624 | B1 * | 8/2003 | Zhang | H04N 21/2343 375/E7.189 |
| 7,027,507 | B2 * | 4/2006 | Wu | H04N 19/428 375/E7.113 |
| 7,110,459 | B2 | 9/2006 | Srinivasan | |
| 7,116,831 | B2 | 10/2006 | Mukerjee et al. | |
| 7,224,731 | B2 * | 5/2007 | Mehrotra | H04N 19/18 375/E7.145 |
| 7,305,034 | B2 | 12/2007 | Srinivasan | |
| 7,620,109 | B2 * | 11/2009 | Srinivasan | H04N 19/61 375/240.29 |
| 7,831,088 | B2 * | 11/2010 | Frakes | H04N 19/51 382/154 |
| 7,956,930 | B2 * | 6/2011 | Sullivan | H04N 7/0102 348/581 |
| 8,107,539 | B2 * | 1/2012 | Hannuksela | H04N 19/895 375/240.26 |
| 8,130,825 | B2 * | 3/2012 | Scheuermann | H04N 21/4341 348/390.1 |
| 8,374,248 | B2 * | 2/2013 | Cho | H04N 19/59 375/240.12 |
| 8,411,750 | B2 * | 4/2013 | Dane | H04N 19/61 375/240.01 |
| 8,498,493 | B1 * | 7/2013 | Choudhary | H04N 19/523 375/240.16 |
| 8,542,741 | B2 * | 9/2013 | Yokoyama | H04N 5/145 375/240.11 |
| 8,582,652 | B2 * | 11/2013 | Wang | H04N 19/176 375/240.16 |
| 8,867,620 | B2 * | 10/2014 | Sugio | H04N 19/56 348/420.1 |
| 8,885,722 | B2 * | 11/2014 | Sugio | H04N 19/137 375/240.12 |
| 9,288,505 | B2 * | 3/2016 | Chen | H04N 19/597 |
| 9,363,512 | B2 * | 6/2016 | Campbell | H04N 19/52 |
| 9,674,519 | B2 * | 6/2017 | Chen | H04N 19/117 |
| 9,749,642 | B2 | 8/2017 | Sullivan et al. | |
| 9,774,881 | B2 | 9/2017 | Zhou et al. | |
| 9,900,603 | B2 | 2/2018 | Sullivan et al. | |
| 9,942,560 | B2 | 4/2018 | Silkin et al. | |
| 10,313,680 | B2 | 6/2019 | Sullivan et al. | |
| 10,587,891 | B2 | 3/2020 | Zhou et al. | |
| 10,681,356 | B2 | 6/2020 | Sullivan et al. | |
| 10,735,747 | B2 | 8/2020 | Sullivan et al. | |
| 11,095,904 | B2 | 8/2021 | Sullivan et al. | |
| 11,546,629 | B2 | 1/2023 | Zhou et al. | |
| 11,638,016 | B2 | 4/2023 | Sullivan et al. | |
| 2003/0138047 | A1 * | 7/2003 | Orchard | H04N 19/61 375/E7.22 |
| 2004/0139462 | A1 * | 7/2004 | Hannuksela | H04N 19/142 375/E7.165 |
| 2007/0183676 | A1 * | 8/2007 | Hannuksela | H04N 19/23 375/E7.182 |
| 2007/0223582 | A1 * | 9/2007 | Borer | H04N 19/521 375/E7.137 |
| 2008/0130742 | A1 * | 6/2008 | Scheuermann | H04N 19/433 375/E7.126 |
| 2008/0137753 | A1 | 6/2008 | He | |
| 2008/0181308 | A1 * | 7/2008 | Wang | H04N 19/156 375/E7.125 |
| 2009/0141808 | A1 * | 6/2009 | Wong | H04N 19/134 375/E7.076 |
| 2009/0168871 | A1 * | 7/2009 | Lu | H04N 19/109 375/240.11 |
| 2010/0104010 | A1 * | 4/2010 | Guo | H04N 19/61 375/E7.243 |
| 2011/0038419 | A1 | 2/2011 | Han | |
| 2011/0176611 | A1 * | 7/2011 | Huang | H04N 19/46 375/E7.123 |
| 2011/0194610 | A1 * | 8/2011 | Xu | H04N 19/523 375/E7.243 |
| 2011/0243232 | A1 * | 10/2011 | Alshina | H04N 19/98 375/E7.125 |
| 2011/0243234 | A1 * | 10/2011 | Kondo | H04N 19/61 375/E7.123 |
| 2011/0251431 | A1 | 10/2011 | Hizaler et al. | |
| 2012/0044990 | A1 * | 2/2012 | Bivolarsky | H04N 19/61 375/240.03 |
| 2012/0051427 | A1 * | 3/2012 | Parfenov | H04N 19/159 375/E7.248 |
| 2012/0128069 | A1 * | 5/2012 | Sato | H04N 19/436 375/E7.243 |
| 2012/0207220 | A1 * | 8/2012 | Kim | H04N 19/517 375/E7.193 |
| 2012/0207227 | A1 | 8/2012 | Tsai et al. | |
| 2012/0213284 | A1 * | 8/2012 | Chen | H04N 19/157 375/240.16 |
| 2012/0218473 | A1 * | 8/2012 | Xu | H04N 19/537 348/E5.066 |
| 2012/0236115 | A1 * | 9/2012 | Zhang | H04N 19/187 348/43 |
| 2012/0314771 | A1 * | 12/2012 | Lim | H04N 19/463 382/233 |
| 2013/0003849 | A1 | 1/2013 | Chien et al. | |
| 2013/0115928 | A1 * | 5/2013 | Kies | H04L 67/535 455/414.1 |
| 2013/0182755 | A1 * | 7/2013 | Chen | H04N 19/70 375/240.01 |
| 2013/0188717 | A1 * | 7/2013 | Chen | H04N 19/30 375/240.16 |
| 2013/0188733 | A1 | 7/2013 | Van der Auwera et al. | |
| 2013/0287109 | A1 * | 10/2013 | Wang | H04N 19/61 375/240.16 |
| 2013/0294513 | A1 * | 11/2013 | Seregin | H04N 19/52 375/240.14 |
| 2013/0322538 | A1 * | 12/2013 | Seregin | H04N 19/70 375/240.12 |
| 2013/0329789 | A1 * | 12/2013 | Wang | H04N 19/50 375/240.12 |
| 2013/0336394 | A1 * | 12/2013 | Tu | H04N 19/44 375/240.12 |
| 2014/0010310 | A1 | 1/2014 | Rapaka | |
| 2023/0209070 | A1 | 6/2023 | Sullivan et al. | |

OTHER PUBLICATIONS

Office Action dated Aug. 3, 2023, from Brazilian Patent Application No. BR122022001655-3, 10 pp.

Examiner's Report dated Aug. 8, 2024, from Canadian Patent Application No. 3,118,603, 3 pp.

(56) References Cited

OTHER PUBLICATIONS

Guo et al., "Adaptive Motion Vector Resolution with Implicit Signaling," IEEE Int'l Conf. on Image Processing, pp. 2057-2060 (Sep. 2010).

Notice of Acceptance dated Dec. 7, 2018, from Australian Patent Application No. 2014376190, 3 pp.

Notice of Allowance dated Mar. 4, 2024, from U.S. Appl. No. 18/179,166, 10 pp.

Notice of Allowance dated May 20, 2024, from U.S. Appl. No. 18/179,166, 9 pp.

Notice of Allowance dated Jul. 29, 2024, from Korean Patent Application No. 10-2023-7028185, 8 pp.

Office Action dated Dec. 14, 2023, from Korean Patent Application No. 10-2023-7028185, 9 pp.

Office Action dated Feb. 26, 2024, from Brazilian Patent Application No. BR112016015618-8, 8 pp.

Decision of Refusal dated Jun. 20, 2023, from Japanese Patent Application No. 2021-158778, 7 pp.

Examiner's Report dated Mar. 29, 2023, from Canadian Patent Application No. 3,118,603, 4 pp.

Extended European Search Report dated Apr. 5, 2023, from European Patent Application No. 23152981.9, 15 pp.

Notice of Allowance dated Dec. 14, 2022, from U.S. Appl. No. 17/366,887, 9 pp.

Notice of Allowance dated Feb. 16, 2023, from Korean Patent Application No. 10-2022-7024378, 8 pp.

Notice of Allowance dated May 19, 2023, from Korean Patent Application No. 10-2022-7038477, 8 pp.

Office Action dated Dec. 8, 2022, from Korean Patent Application No. 10-2022-7038477, 10 pp.

Tsai et al., "CE4 Subset3: Slice Common Information Sharing," JCTVC-E045, 7 pp. (Mar. 2011).

* cited by examiner

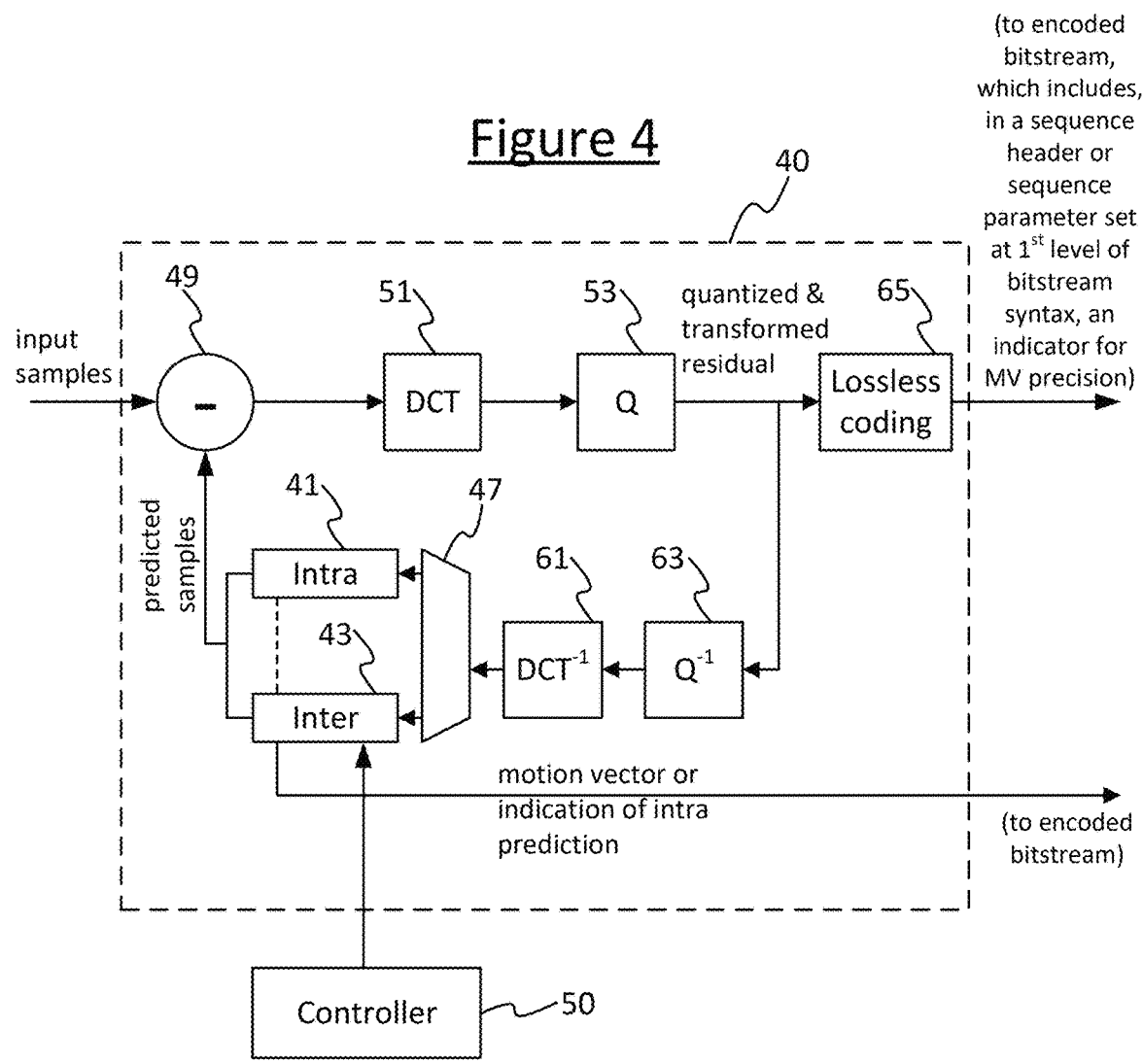
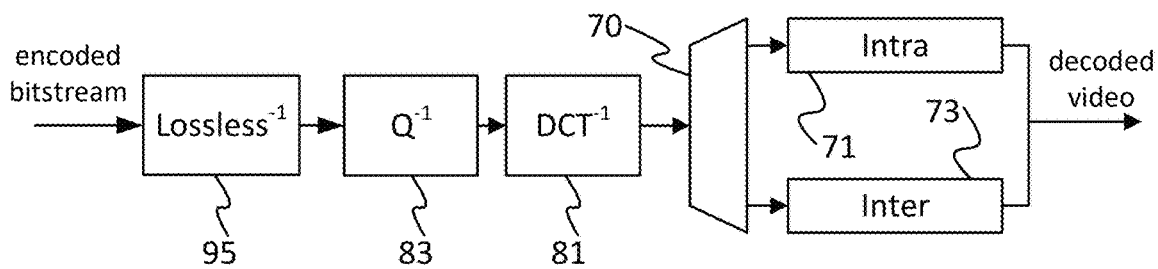

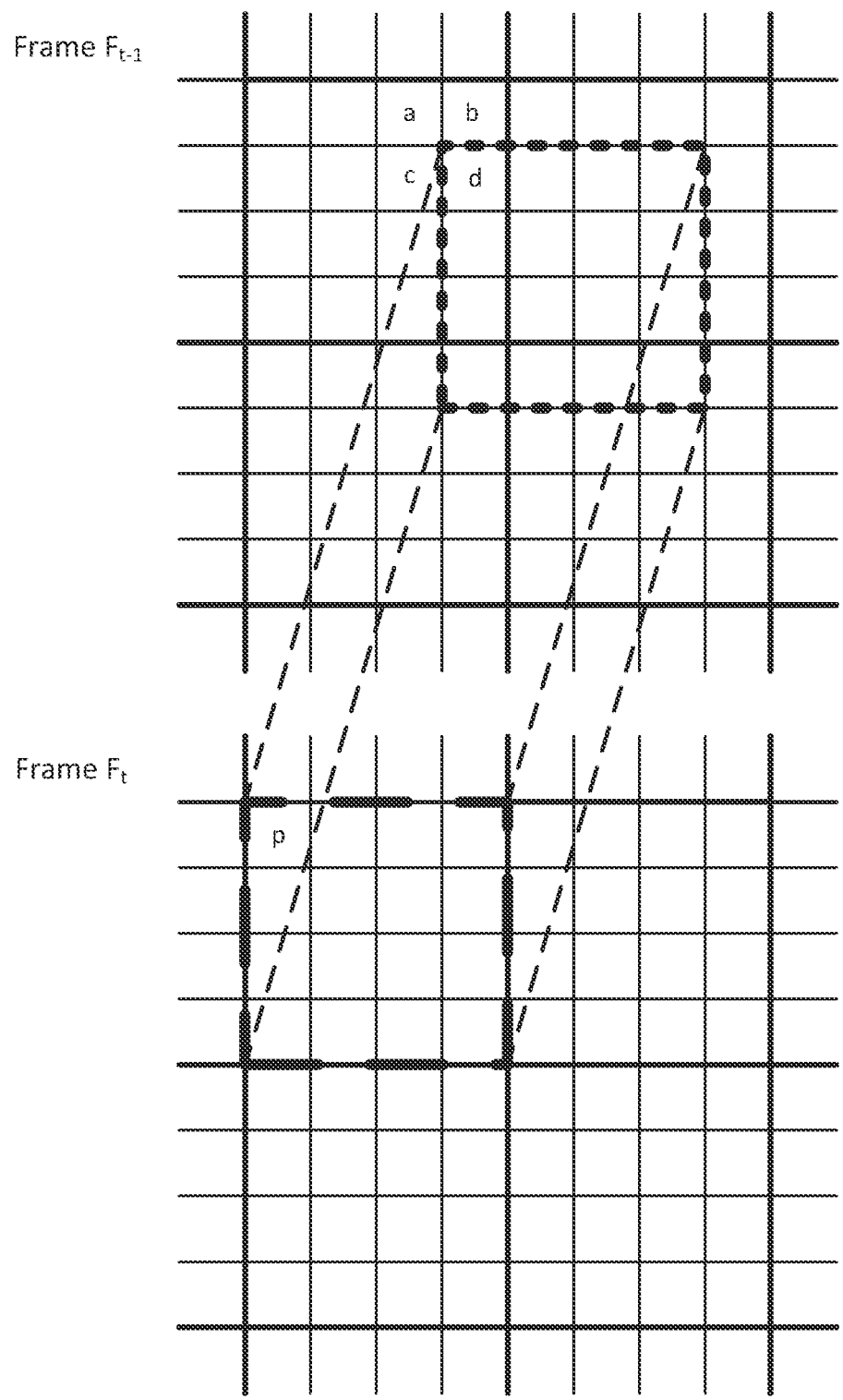

REPRESENTING MOTION VECTORS IN AN ENCODED BITSTREAM

RELATED APPLICATIONS

This application is a continuation of U.S. patent application Ser. No. 16/779,264, filed Jan. 31, 2020, which is a continuation of U.S. patent application Ser. No. 15/711,627, filed Sep. 21, 2017, which is a continuation of U.S. patent application Ser. No. 14/530,625, filed Oct. 31, 2014. U.S. patent application Ser. No. 14/530,625 claims the benefit of U.S. Provisional Patent Application No. 61/925,108, filed Jan. 8, 2014, and also claims the benefit of U.S. Provisional Patent Application No. 61/934,506, filed Jan. 31, 2014, the entire disclosures of which are incorporated by reference herein in their entirety.

BACKGROUND

In modern communication systems a video signal may be sent from one terminal to another over a medium such as a wired and/or wireless network, often a packet-based network such as the Internet. For example the video may be part of a VoIP (voice over Internet Protocol) call conducted from a VoIP client application executed on a user terminal such as a desktop or laptop computer, tablet or smart phone.

Typically the frames of the video are encoded by an encoder at the transmitting terminal in order to compress them for transmission over the network. The encoding for a given frame may comprise intra frame encoding whereby blocks are encoded relative to other blocks in the same frame. In this case a target block is encoded in terms of a difference (the residual) between that block and a neighbouring block. Alternatively the encoding for some frames may comprise inter frame encoding whereby blocks in the target frame are encoded relative to corresponding portions in a preceding frame, typically based on motion prediction. In this case a target block is encoded in terms of a motion vector identifying an offset between the block and the corresponding portion from which it is to be predicted, and a difference (the residual) between the block and the corresponding portion from which it is predicted. A corresponding decoder at the receiver decodes the frames of the received video signal based on the appropriate type of prediction, in order to decompress them for output to a screen at the decoder side.

When encoding (compressing) a video, the motion vectors are used to generate the inter frame prediction for the current frame. The encoder first searches for a similar block (the reference block) in a previous encoded frame that best matches the current block (target block), and signals the displacement between the reference block and target block to the decoder as part of the encoded bitstream. The displacement is typically represented as horizontal and vertical x and y coordinates, and is referred to as the motion vector.

The reference "block" is not in fact constrained to being at an actual block position in the reference frame, i.e. is not restricted to the same grid as the target blocks, but rather it is a correspondingly-sized portion of the reference frame offset relative to the target block's position by the motion vector. According to present standards the motion vectors are represented at fractional pixel resolution. For instance in the H.264 standard each motion vector is represented at ¼ pixel resolution. So by way of example, if a 16×16 block in the current frame is to be predicted from another 16×16 block in the previous frame that is at 1 pixel left of the position of the target block, then the motion vector is (4,0). Or if the target block is to be predicted from a reference block that is only, say, ¾ of a pixel to the left of the target block, the motion vector is (3,0). The reference block at a fractional pixel position does not actually exist per se, but rather it is generated by interpolation between pixels of the reference frame. The sub-pixel motion vectors can achieve significant performance in terms of compression efficiency.

SUMMARY

However, using a fractional pixel resolution incurs more bits to encode the motion vector than if motion was estimated at integer pixel resolution, and it also incurs more processing resources in searching for the best matching reference. For video coding this may be worthwhile, e.g. as the reduced size of a better-matched residual may generally outweigh the bits incurred encoding the motion vector, or the quality achieved may be considered to justify the resources. However, not all moving images to be encoded are videos (i.e. captured from a camera). It is recognised herein that when encoding (compressing) a moving image that is captured from a screen rather than a camera, most of the motion vectors in the encoded bit stream will generally point to integer pixels, while very few of them tend to be found at fractional pixel positions. Thus while encoders normally represent motion vectors in bit streams in units of ¼ pixels, for screen sharing or recording applications bandwidth can in fact be saved without undue loss of quality by encoding the motion vectors in units of only 1 pixel.

Nonetheless, considering that the fractional motion vector can still be useful for normal video (captured by camera) or perhaps other moving images (e.g. animations), the motion vector may be signalled in a flexible way: when the video source is from a captured screen the motion vector may be signalled in units of 1 pixel, but for normal video and/or other moving images a fractional pixel unit may still be used.

More generally, there may be various circumstances in which it may be useful to have control over whether fractional or integer pixel motion vector resolution is used, e.g. depending on how the designer of the encoder wishes to implement any desired trade off or effect. E.g. perhaps some video or animations due to some aspect of their nature will be more efficiently served by integer pixel resolution in the motion estimation, while other videos or other types of moving image may be more efficiently served by fractional pixel resolution.

Hence according to one aspect disclosed herein, there is provided format for use in encoding moving image data, whereby moving image data encoded according to said format comprises:
 a sequence of frames including plurality of said frames in which at least a region is encoded using motion estimation;
 a respective set of motion vector values representing motion vectors of the motion estimation for each respective one of said frames, or each respective one of one or more regions within each of said frames; and
 at least one respective indicator associated with each of said respective frames or regions, indicating whether the respective motion vector values of the respective frame or region are encoded at a first resolution or a second resolution.

The motion vector values are encoded according to a protocol whereby motion vector values encoded at the first resolution are represented on a scale having a larger number of finer steps, and motion vector values encoded at the second resolution are represented on a scale having a smaller number of coarser steps and thereby incur fewer bits on average in the encoded bitstream. The coarser steps represent integer pixel units and the finer steps represent fractional pixel units.

According to a further aspect disclosed herein, there is provided a network element or computer-readable storage medium carrying bitstream of moving image data encoded according to such a format or protocol.

In embodiments, there may be provided a bitstream comprising some of said plurality of frames or regions encoded at the first resolution and others of said plurality of frames or regions encoded at the second resolution, the respective indicator indicating the resolution individually for each of said plurality of (inter frame encoded) frames or regions.

In embodiments each of the motion vector values of each frame or region may be included in a motion vector field of the encoded bitstream, and according to said protocol the motion vector field may have a reduced size for frames or regions whose motion vectors are encoded at the second resolution.

According to another aspect disclosed herein, there is provided a decoder comprising an input for receiving moving image data in encoded form, and a motion prediction module. The moving image data includes a plurality of frames in which at least a region is encoded using motion estimation (i.e. inter frame encoded frames), based on a format or protocol in accordance with any of the embodiments disclosed herein. The motion prediction module decodes said (inter frame encoded) frames or regions based on the motion vector values. This includes reading each of the indictors to determine whether the motion vector values of the respective frame or region are encoded at the first or second resolution, and if the first resolution to interpret the motion vector values in units of fractional pixels, and if the second resolution to interpret the motion vector values in units of integer pixels.

In embodiments, the moving image data may comprise a respective two indicators associated with each of said frames or regions, the two indicators indicating the resolution of respective motion vectors in two dimensions, and the motion prediction module may be configured to read both indicators and interpret the respective motion vector values accordingly.

In embodiments each of at least some of said frames may be divided into multiple regions; the moving image data may comprise at least one respective indicator associated with each respective one of the multiple regions to individually indicate whether the motion vector values of the respective region are encoded at the first or second resolution; and the motion prediction module may be configured to read the indictors to determine whether the motion vector values of each respective region are encoded at the first or second resolution, and to interpret the respective motion vector values in said units of fractional pixels or integer pixels accordingly. In embodiment said regions may be slices of an H.26x standard.

In embodiments, the moving image data may further comprises a setting to set whether the resolution of the motion vector values is being indicated per region or per frame, and the motion prediction module may be configured to read the setting and interpret the motion vector values accordingly.

In further embodiments, the motion prediction module may be configured to interpret the respective motion vector values in units of fractional pixels as a default if the respective indictor is not present for one of said frames or regions.

In yet further embodiments, the moving image data including the motion vectors may be further encoded according to a lossless encoding technique. The decoder may comprise an inverse of a lossless encoding stage preceding said decoding by the motion prediction module.

According to a further aspect, there is provided a computer program product embodied on a computer-readable storage medium and configured so as when executed to perform operations of the decoder according to any of the embodiments disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To aid understanding of the present disclosure and to show how embodiments may be put into effect, reference is made by way of example to the accompanying drawings in which:

FIG. 4 is a schematic block diagram of an encoder,

FIG. 5 is a schematic block diagram of a decoder,

FIG. 7 is a schematic representation of another inter frame encoding scheme.

DETAILED DESCRIPTION

Figure 1:
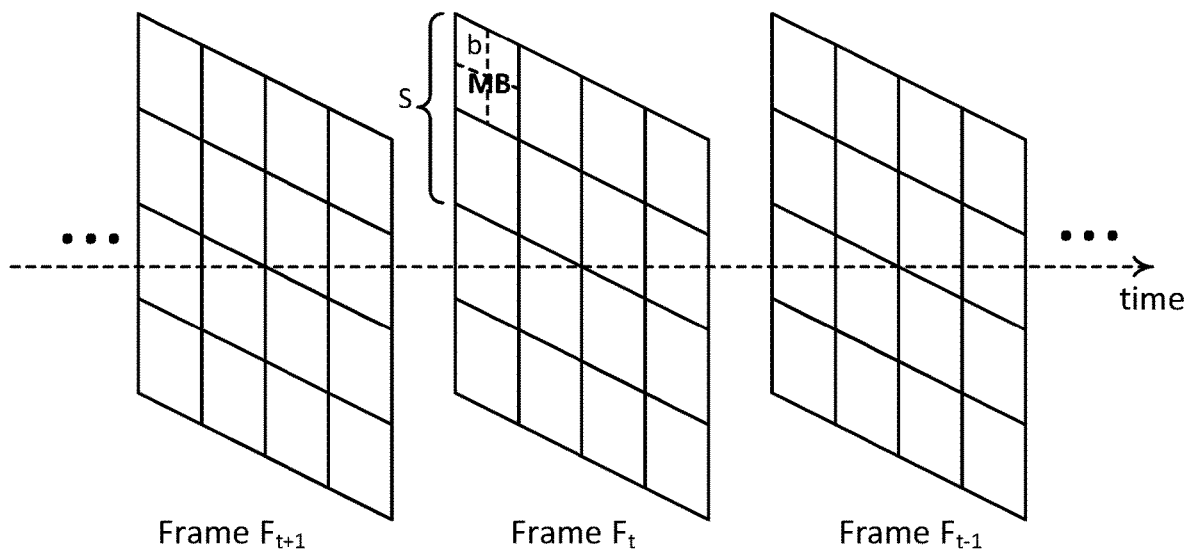
FIG. 1 is a schematic representation of a video stream.

FIG. 1 gives a schematic illustration of an input video signal captured from a camera, and divided into spatial divisions to be encoded by a video encoder so as to generate an encoded bitstream. The signal comprises a moving video image divided in time into a plurality of frames (F), each frame representing the image at a different respective moment in time ( . . . t−1, t, t+1 . . . ). Within each frame, the frame is divided in space into a plurality of divisions each representing a plurality of pixels. These divisions may be referred to as blocks. In certain schemes, the frame is divided and sub-divided into different levels of block. For example each frame may be divided into macroblocks (MB) and each macroblock may be divided into blocks (b), e.g. each block representing a region of 8×8 pixels within a frame and each macroblock representing a region of 2×2 blocks (16×16 pixels). In certain schemes each frame can also be divided into independently decodable slices(S), each comprising a plurality of macroblocks. The slices S can generally take any shape, e.g. each slice being one or more rows of macroblocks or an irregular or arbitrarily defined selection of macroblocks (e.g. corresponding to a region of interest, ROI, in the image).

With regard to the term "pixel", in the following the term is used to refer to samples and sampling positions in the sampling grid for the picture array (sometimes in the literature the term "pixel" is instead used to refer to all three colour components corresponding to one single spatial position, and sometimes it is used to refer to a single position or a single integer sample value in a single array). The resolution of the sampling grid is often different between the luma and chroma sampling arrays. In embodiments the following may be applied to a 4:4:4 representation, but it may potentially also be applied in 4:2:2 and 4:2:0 for example.

Note also that while any given standard may give specific meanings to the terms block or macroblock, the term block is also often used more generally in the art to refer to a division of the frame at a level on which encoding and decoding operations like intra or inter prediction are performed, and it is this more general meaning that will be used herein unless specifically stated otherwise. For example the blocks referred to herein may in fact be the divisions called blocks or macroblocks in the H.26x standards, and the various encoding and decoding stages may operate at a level of any such divisions as appropriate to the encoding mode, application and/or standard in question.

A block in the input signal as captured is usually represented in the spatial domain, where each colour-space channel is represented as a function of spatial position within the block. For example in YUV colour space each of the luminance (Y) and chrominance (U,V) channels may be represented as a function of Cartesian coordinates x and y, Y(x,y), U(x,y) and V(x,y); or in RGB colour space each of the red (R), green (G) and blue (B) channels may be represented as a function of Cartesian coordinates R(x,y), G(x,y), B(x,y). In this representation, each block or portion is represented by a set of pixel values at different spatial coordinates, e.g. x and y coordinates, so that each channel of the colour space is represented in terms of a respective magnitude of that channel at each of a discrete set of pixel locations.

Prior to quantization however, the block may be transformed into a transform domain representation as part of the encoding process, typically a spatial frequency domain representation (sometimes just referred to as the frequency domain). In the frequency domain each colour-space channel in the block is represented as a function of spatial frequency (dimensions of 1/length) in each of two dimensions. For example this could be denoted by wavenumbers $k_x$ and $k_y$ in the horizontal and vertical directions respectively, so that the channels may be expressed as $Y(k_x, k_y)$, $U(k_x, k_y)$ and $V(k_x, k_y)$ in YUV space; or $R(k_x, k_y)$, $G(k_x,k_y)$, $B(k_x,k_y)$ in RGB space. Thus instead of representing a colour-space channel in terms of a magnitude at each of a discrete set of pixel positions, the transform represents each colour-space channel in terms of a coefficient associated with each of a discrete set of spatial frequency components which make up the block, i.e. an amplitude of each of a discrete set of spatial frequency terms corresponding to different frequencies of spatial variation across the block. Possibilities for such transforms include a Fourier transform, Discrete Cosine Transform (DCT), Karhunen-Loeve Transform (KLT), or others.

Figure 2:
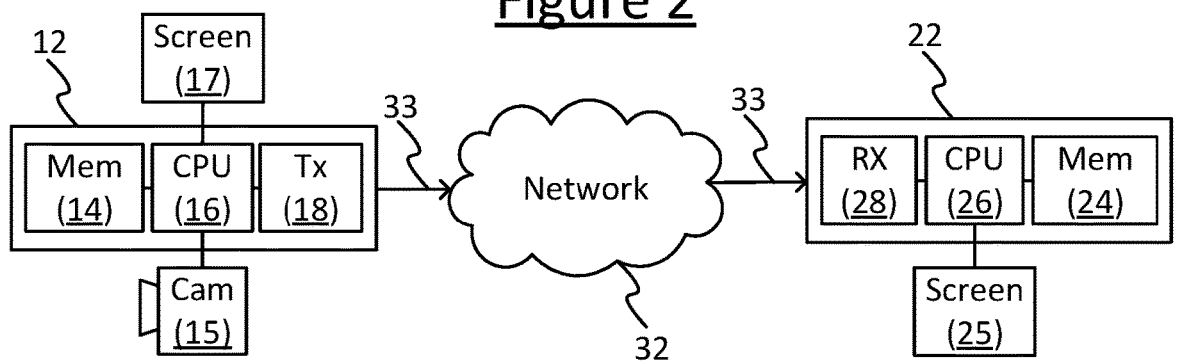
FIG. 2 is a schematic block diagram of a communication system.

The block diagram of FIG. 2 gives an example of a communication system in which the techniques of this disclosure may be employed. The communication system comprises a first, transmitting terminal 12 and a second, receiving terminal 22. For example, each terminal 12, 22 may comprise one of a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a computer-readable storage medium 14 such as a flash memory or other electronic memory, a magnetic storage device, and/or an optical storage device. The first terminal 12 also comprises a processing apparatus 16 in the form of a processor or CPU having one or more execution units, a transceiver such as a wired or wireless modem having a transmitter 18, a video camera 15 and a screen 17 (i.e. a display or monitor). Each of the camera 15 and screen 17 may or may not be housed within the same casing as the rest of the terminal 12 (and even the transmitter 18 could be internal or external, e.g. comprising a dongle or wireless router in the latter case). The storage medium 14, video camera 15, screen 17 and transmitter 18 are each operatively coupled to the processing apparatus 16, and the transmitter 18 is operatively coupled to the network 32 via a wired or wireless link. Similarly, the second terminal 22 comprises a computer-readable storage medium 24 such as an electronic, magnetic, and/or an optical storage device; and a processing apparatus 26 in the form of a CPU having one or more execution units. The second terminal comprises a transceiver such as a wired or wireless modem having at least a receiver 28 and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage 14 on the first terminal 12 stores at least an encoder for encoding moving image data, the encoder being arranged to be executed on the respective processing apparatus 16. When executed the encoder receives a "raw" (unencoded) input video stream from the video camera 15, it is operable to encode the video stream so as to compress it into a lower bitrate stream, and outputs the encoded video stream for transmission via the transmitter 18 and communication network 32 to the receiver 28 of the second terminal 22. The storage 24 on the second terminal 22 stores at least a video decoder arranged to be executed on its own processing apparatus 26. When executed the decoder receives the encoded video stream from the receiver 28 and decodes it for output to the screen 25.

The encoder and decoder are also operable to encode and decode other types of moving image data, including screen sharing streams. A screen sharing stream is image data captured from a screen 17 at the encoder side so that one or more other, remote users can see what the user at the encoder side is seeing on screen, or so the user of that screen can record what's happening on screen for playback to one or more other users later. In the case of a call conducted between a transmitting terminal 12 and receiving terminal 22, the moving content of the screen 17 at the transmitting terminal 12 will be encoded and transmitted live (in real-time) to be decoded and displayed on the screen 25 of the receiving terminal 22. For example the encoder-side user may wish to share with another user how he or she is working the desktop of his or her operating system, or some application.

Note that where it is said that a screen sharing stream is captured from a screen, or the like, this does not limit to any particular mechanism for doing so. E.g. the data could be read from a screen buffer of the screen 17, or captured by receiving an instance of the same graphical data that is being output from the operating system or from an application for display on the screen 17.

Figure 3:
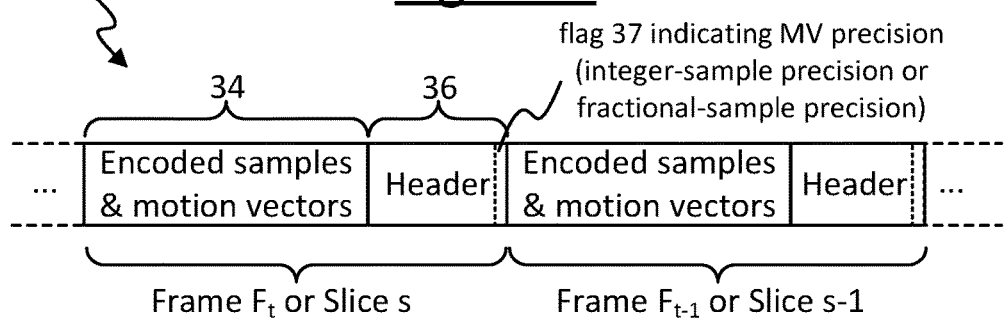
FIG. 3 is a schematic representation of an encoded video stream.

FIG. 3 gives a schematic representation of an encoded bitstream 33 as would be transmitted from the encoder running on the transmitting terminal 12 to the decoder running on the receiving terminal 22. The bitstream 33 comprises encoded image data 34 for each frame or slice comprising the encoded samples for the blocks of that frame or slice along with any associated motion vectors In one application, the bitstream may be transmitted as part of a live (real-time) call such as a VoIP call between the transmitting and receiving terminals 12, 22 (VoIP calls can also include video and screen sharing). The bitstream 33 also comprises header information 36 associated with each fame or slice. In embodiments the header 36 is arranged to include at least one additional element in the form of at least one flag 37 indicating the resolution of the motion vector, which will be discussed in more detail below.

FIG. 4 is a block diagram illustrating an encoder such as might be implemented on transmitting terminal 12. The encoder comprises a main encoding module 40 comprising: a discrete cosine transform (DCT) module 51, a quantizer 53, an inverse transform module 61, an inverse quantizer 63, an intra prediction module 41, an inter prediction module 43, a switch 47, a subtraction stage (−) 49, and a lossless decoding stage 65. The encoder further comprises a control module 50 coupled to the inter prediction module 43. Each of these modules or stages may be implemented as a portion of code stored on the transmitting terminal's storage medium 14 and arranged for execution on its processing apparatus 16, though the possibility of some or all of these being wholly or partially implemented in dedicated hardware circuitry is not excluded.

The subtraction stage 49 is arranged to receive an instance of the input signal comprising a plurality of blocks over a plurality of frames (F). The input stream is received from a camera 15 or captured from what is being displayed on the screen 17. The intra or inter prediction 41, 43 generates a predicted version of a current (target) block to be encoded based on a prediction from another, already-encoded block or correspondingly-sized reference portion. The predicted version is supplied to an input of the subtraction stage 49, where it is subtracted from the input signal (i.e. the actual signal) in the spatial domain to produce a residual signal representing a difference between the predicted version of the block and the corresponding block in the actual input signal.

In intra prediction mode, the intra prediction 41 module generates a predicted version of the current (target) block to be encoded based on a prediction from another, already-encoded block in the same frame, typically a neighbouring block. When performing intra frame encoding, the idea is to only encode and transmit a measure of how a portion of image data within a frame differs from another portion within that same frame. That portion can then be predicted at the decoder (given some absolute data to begin with), and so it is only necessary to transmit the difference between the prediction and the actual data rather than the actual data itself. The difference signal is typically smaller in magnitude, so takes fewer bits to encode (due to the operation of the lossless compression stage 65—see below).

In inter prediction mode, the inter prediction module 43 generates a predicted version of the current (target) block to be encoded based on a prediction from another, already-encoded reference portion in a different frame than the current block, the reference portion having the size of a block but being offset relative to the target block in the spatial domain by a motion vector that is predicted by the inter prediction module 43 (inter prediction may also be referred to as motion prediction or motion estimation). The inter-prediction module 43 selects the optimal reference for a given target block by searching, in the spatial domain, through a plurality of candidate reference portions offset by a plurality of respective possible motion vectors in one or more frames other than the target frame, and selecting the candidate that minimises the residual with respect to the target block according to a suitable metric. The inter prediction module 43 is switched into the feedback path by switch 47, in place of the intra frame prediction stage 41, and so a feedback loop is thus created between blocks of one frame and another in order to encode the inter frame relative to those of the other frame. I.e. the residual now represents the difference between the inter predicted block and the actual input block. This typically takes even fewer bits to encode than intra frame encoding.

The samples of the residual signal (comprising the residual blocks after the predictions are subtracted from the input signal) are output from the subtraction stage 49 through the transform (DCT) module 51 (or other suitable transformation) where their residual values are converted into the frequency domain, then to the quantizer 53 where the transformed values are converted to substantially discrete quantization indices. The quantized, transformed indices of the residual as generated by the transform and quantization modules 51, 53, as well as an indication of the prediction used in the prediction modules 41,43 and any motion vectors generated by the inter prediction module 43, are all output for inclusion in the encoded video stream 33 (see element 34 in FIG. 3); via a further, lossless encoding stage 65 such as a Golomb encoder or entropy encoder where the motion vectors and transformed, quantized indices are further compressed using lossless encoding techniques known in the art.

An instance of the quantized, transformed signal is also fed back though the inverse quantizer 63 and inverse transform module 61 to generate a predicted version of the block (as would be seen at the decoder) for use by the selected prediction module 41 or 43 in predicting a subsequent block to be encoded, in the same way the current target block being encoded was predicted based on an inverse quantized and inverse transformed version of a previously encoded block. The switch 47 is arranged to pass the output of the inverse quantizer 63 to the input of either the intra prediction module 41 or inter prediction module 43 as appropriate to the encoding used for the frame or block currently being encoded.

FIG. 5 is a block diagram illustrating a decoder such as might be implemented on the receiving terminal 22. The decoder comprises an inverse of the lossless encoding 95, an inverse quantization stage 83, an inverse DCT transform stage 81, a switch 70, and an intra prediction stage 71 and a motion compensation stage 73. Each of these modules or stages may be implemented as a portion of code stored on the receiving terminal's storage medium 24 and arranged for execution on its processing apparatus 26, though the possibility of some or all of these being wholly or partially implemented in dedicated hardware circuitry is not excluded.

The inverse quantizer 81 is arranged to receive the encoded signal 33 from the encoder, via the receiver 28 and inverse lossless coding stage 95. The inverse quantizer 81 converts the quantization indices in the encoded signal into de-quantized samples of the residual signal (comprising the residual blocks) and passes the de-quantized samples to the reverse DCT module 81 where they are transformed back from the frequency domain to the spatial domain. The switch 70 then passes the de-quantized, spatial domain residual samples to the intra or inter prediction module 71 or 73 as appropriate to the prediction mode used for the current frame or block being decoded, and the intra or inter prediction module 71, 73 uses intra or inter prediction respectively to decode the blocks. Which mode to use is determined using the indication of the prediction and/or any motion vectors received with the encoded samples 34 in the encoded bitstream 33. Following on from this stage, the decoded blocks are output to be played out through the screen 25 at the receiving terminal 22.

Figure 6:
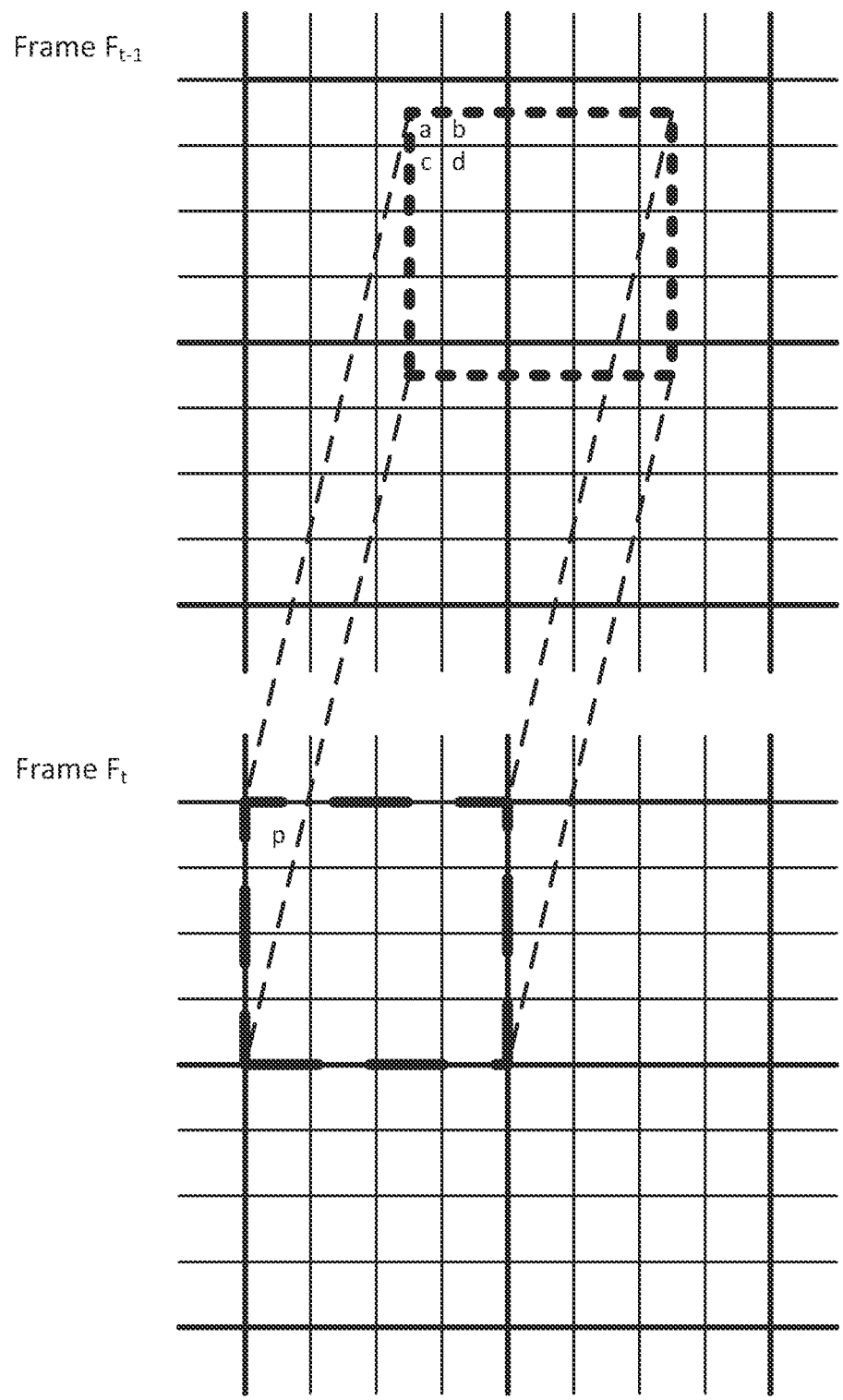
FIG. 6 is a schematic representation of inter frame encoding scheme.

As mentioned, codecs according to conventional standards perform motion prediction at a resolution of quarter pixels, meaning the motion vectors are also expressed in terms of quarter pixel steps. An example of quarter pixel resolution motion estimation is shown in FIG. 6. In this example, pixel p in the upper left corner of the target block is predicted from an interpolation between the pixels a, b, c and d, and the other pixels of the target block will also be predicted based on a similar interpolation between respective groups of pixels in the reference frame, according to the offset between the target block in one frame and the reference portion in the other frame (these blocks being shown with bold dotted lines in FIG. 6). However, performing motion estimation with this granularity has consequences, as discussed below.

Referring to the lossless coder 65 and decoder 95, lossless coding is a form of compression which works not by throwing away information (like quantization), but by using different lengths of codeword to represent different values depending on how likely those values are to occur, or how frequently they occur, in the data to be encoded by the lossless encoding stage 65. For example the number of leading 0s in the codeword before encountering a 1 may indicate the length of the codeword, so 1 is the shortest codeword, then 010 and 011 are the next shortest, then 00100 . . . , and so forth. Thus the shortest codewords are much shorter than would be required if a uniform codeword length was used, but the longest are longer than that. But by allocating the most frequent or likely values to the shortest codewords and only the least likely or frequently occurring values to the longer codewords, the resulting bitstream 33 can on average incur fewer bits per encoded value than if a uniform codeword length was used, and thus achieve compression without discarding any further information.

Much of the encoder 40 prior to the lossless encoding stage 65 is designed to try to make as many of the values as small as possible before being passed through the lossless coding stage 65. As they then occur more often, smaller values will then incur lower bitrate in the encoded bitstream 33 than larger values. This is why the residual is encoded as opposed to absolute samples. It is also the rationale behind the transform 51, as many samples tend to transform to zero or small coefficients in the transform domain.

A similar consideration can be applied to the encoding of the motion vectors.

For instance, in H.264/MPEG-4 Part 10 and H.265/HEVC the motion vector is encoded with Exponential Golomb Coding. The following table shows the motion vector values and the encoded bits.

| Value | Codeword | Number of Bits Incurred |
|---|---|---|
| 0 | 1 | 1 |
| 1 | 010 | 3 |
| 2 | 011 | 3 |
| 3 | 00100 | 5 |
| 4 | 00111 | 5 |
| 5 | 0001000 | 7 |
| . . . | | |

From the table above it can be seen that the larger the value is, the more bits are used. This means the higher the resolution of the motion vector, the more bits are incurred. E.g. so with a quarter pixel resolution, an offset of 1 pixel has to be represented by a value of 4, incurring 5 bits in the encoded bitstream.

In encoding video (captured from a camera) the cost of this resolution in the motion vector may be worthwhile, as the finer resolution may provide more opportunities in the search for a lower cost residual reference. However, it is observed herein that for moving images captured from a screen, most of the spatial displacements tend to be at full pixel displacements and few of them tend to be at fractional pixel positions, so most of the motion vectors tend to point to integer pixel values and very few tend to point to fractional pixel values.

On such a basis, it may be desirable to encode the motion vectors for image data captured from a screen with a resolution of 1 pixel. Considering the fact that no bits need to be spent on the fractional parts of motion vectors for such content, this means the bit rate incurred in encoding such content can be reduced.

For example, while encoders normally interpret motion vectors in bitstreams in units of ¼ pixel offsets, an encoder may in fact often be able to save bit rate by abandoning this resolution and instead encoding the motion vectors for screen coding applications in units of integer pixel offsets. Although it will reduce the precision of the motion vectors by a factor of four, such precision is generally less worthwhile for screen sharing or recording applications and this also reduces the number of bits needed to code the vectors. To predict a current (target) block from a reference block 1 pixel left of the target block, the motion vector will be (1,0) instead of (4,0). Using the above Golomb encoding, this means the bits incurred for encoding the motion vector change from (00111, 1) to (010, 1) and so two bits are saved in this case.

Furthermore, in embodiments the reduced resolution motion vector may also reduce the complexity of the motion estimation performed at the encoder by restricting the motion vector search to integer values, thus reducing processing resources incurred by the search. Alternatively it would be possible to perform a normal search and round the resulting motion vectors to integer values.

FIG. 7 shows an example of motion prediction constrained to a resolution of whole pixels only, with the motion vector being constrained to whole pixel steps only. In contrast with FIG. 6, the pixel p is predicted only from a single, whole pixel a with no interpolation. It could alternatively have been predicted from pixel b, c, d or another pixel depending on the offset between the target block in one frame and the reference portion in the other frame (shown again with bold dotted lines), but due to the constraint it could not have been predicted from an interpolation between pixels. Note: for any given block the quarter pixel prediction as illustrated by way of example in FIG. 6 could happen to have generated a whole pixel offset with no interpolation, if that gave the lowest residual. However, it would not have been constrained to doing so, and over a sizable image it would be highly unlikely that would have happened for all blocks.

Considering that fractional motion vector values can still be very useful for camera-captured content, in embodiments the encoder 40 is provided with a controller 50 coupled to the motion prediction module 43 with the controller 50 being configured to select the motion vector resolution in a flexible way: when the source data is from a captured screen 17 and there is no fractional pixel motion, the motion vector is encoded and transmitted in units of only whole pixels; but for camera-content video the motion vectors are still encoded and transmitted with fractional pixel precision.

In order to do this, the controller 50 may be configured to measure a performance heuristic indicative of the fact that the type of content being captured is screen content. In response, it then disables fractional pixel motion compensation for screen content coding. Alternatively, the controller 50 may receive an indication from an application or the operating system as to what type of data it is supplying to the encoder for encoding, and the controller 50 may select between the mode on that basis. As another option is may make the selection based on historical data. The selection may be made on a per-frame basis, or the mode may be selected individually for different regions within a frame, e.g. on a per slice basis.

Thus before encoding a frame or slice, the encoder is able to decide the motion vector resolution based on factors such as historical statistical data, knowledge of its type of application, multi-pass analysis, or some other such technique. If the encoder decides to use full pixel motion estimation only, the fractional pixel search is skipped. If a scaled motion vector prediction has a fractional part, the prediction may be rounded to an integer value.

In further embodiments, the control may optionally be applied separately to the vertical or horizontal component of a vector. This may be useful for encoding screen video that is scaled horizontally or vertically. E.g. consider a case where the encoder is working with a screen share resized horizontally or vertically. In this case, one of the components of the motion vectors will have fractional parts while the other component will not. To control the bit rate, the encoder may adjust the quantization parameter (QP) in a predefined range. If the QP has reached to the allowed upper bound, and the bit rate is still too high, the encoder may trigger an internal resizer. It resizes the incoming pictures horizontally and at the decoder side the decoded pictures are stretched back to original width. Hence a situation may arise where it would also be useful to treat the horizontal and vertical motion vectors differently.

In order to represent the motion vector on a reduced resolution scale in units or steps of integer pixels, and thus achieve the associated bitrate savings over conventional codecs, the protocol for signalling the motion vectors will have to be updated for future codec standards. In embodiments this may be implemented as an update to the H.265 (HEVC, High Efficiency Video Coding) standard. For encoding captured screen content, the format of the encoded data 34 will be given a reduced size motion vector field for each motion vector. For an encoded screen capture stream encoded in the integer pixel mode, the relevant data 34 will thus comprise integer motion vectors in the bitstream 33 and in embodiments only integer motion vectors in the bitstream 33.

In embodiments this will be optional, with a flag 37 also included in the header 36 to indicate whether fractional pixel (e.g. ¼ pixel) or integer pixel resolution is being used in the encoding of the associated frame or slice (refer again to FIG. 3). If the horizontal and vertical resolutions can be selected separately, two flags 37 will be required per frame or slice.

The following discloses an exemplary embodiment based on an update to the H.265 standard. The modification enables motion vectors to be represented on a reduced, integer pixel scale in the encoded bitstream 33, and adds two flags 37 per slice in the header information 36 of the compressed stream in order to signal the resolution of motion vectors in their horizontal and vertical components.

The modification does not change the syntax or parsing process other than at the header level, but modifies the decoding process by interpreting the motion vector differences as integers and rounding scaled MV predictors to integer values. The modification has been found to increase coding efficiency as much as 7% and on average by about 2% for tested screen content sequences, and it can also reduce the complexity of the encoding and decoding processes.

A high-level indicator is added (at the SPS, PPS, and/or slice header level) to indicate the resolution for interpretation of the motion vectors.

In the decoding process, if the motion vectors are indicated to be at full pixel resolution and a scaled motion vector prediction has a fractional part, then in embodiments the prediction is rounded to an integer value. Motion vector differences are simply interpreted as integer offsets rather than ¾-sample offsets. All other decoding processes remain the same. The parsing process (below the header level) is also unchanged. When the motion vectors are coded at full-sample precision and the input image data uses 4:2:2 or 4:2:0 sampling, the chroma motion vectors can be derived in the usual manner, which will produce ½-sample chroma motion displacements. Alternatively, the chroma motion vectors may also be rounded to integer values.

Regarding the syntax change for signalling the motion vector resolution, in embodiments there are three possible modes, with a mode indicator being signalled at a higher (per frame) header level such as the picture parameter set (PPS), or alternatively at an even higher level such as the sequence parameter set (SPS). The mode indicator has three selectable values. One value indicates that motion vectors are always interpreted as representing ¼ sample offsets (in pictures that use this PPS). A second value indicates that motion vectors are always interpreted as representing integer offsets (in pictures that use this PPS). A third value indicates that there is a signal at a lower level that adaptively selects the interpretation to be applied at that lower level. This lower-level indication may be a flag in the slice header that will be present only when operating in this third mode.

To implement this, in embodiments a new two-bit indicator will be included in the PPS extension to indicate the motion vector resolution control modes. This indicator may be referred to as motion_vector_resolution_control_idc. When the mode is 0, the motion vectors are encoded at ¼ pixel precision and all decoding processes remain unchanged. When the mode is 1, all of the motion vectors in the slices that refer to the PPS are encoded at full pixel precision. And when the mode is 2, the motion vector resolution is controlled on a slice-by-slice basis by a flag in the slice header. When motion_vector_resolution_control_idc is not present, its value is inferred as 0. When motion_vector_resolution_control_idc is equal to 2, an additional flag called slice_motion_vector_resolution_flag is signalled in the slice header. When the flag is zero, the motion vectors of this slice are encoded at ¼ pixel precision, and when the flag is 1, the motion vectors are encoded at full pixel precision. When the flag is not present, its value is inferred as equal to the value of motion_vector_resolution_control_idc.

The modified PPS syntax is illustrated as follows:

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| ... | |
| lists_modification_present_flag | u(1) |
| log2_parallel_merge_level_minus2 | ue(v) |
| slice_segment_header_extension_present_flag | u(1) |
| pps_extension1_flag | u(1) |
| if( pps_extension1_flag ) { | |
|   if( transform_skip_enabled_flag ) | |
|     log2_max_transform_skip_block_size_minus2 | ue(v) |
|   luma_chroma_prediction_enabled_flag | u(1) |
|   motion_vector_resolution_control_idc | u(2) |
|   chroma_qp_adjustment_enabled_flag | u(1) |
|   if( chroma_qp_adjustment_enabled_flag ) { | |
|     diff_cu_chroma_qp_adjustment_depth | ue(v) |
|     chroma_qp_adjustment_table_size_minus1 | ue(v) |
|     for( i = 0; i <= chroma_qp_adjustment_table_size_minus1; i++ ) { | |
|       cb_qp_adjustment[ i ] | se(v) |
|       cr_qp_adjustment[ i ] | se(v) |
|     } | |
|   } | |
|   pps_extension2_flag | u(1) |
| } | |
| if( pps_extension2_flag ) | |
|   while( more_rbsp_data( ) ) | |
|     pps_extension_data_flag | u(1) |
| rbsp_trailing_bits( ) | |
| } | |

The modified slice header syntax is illustrated as follows:

| slice_segment_header( ) { | Descriptor |
|---|---|
| first_slice_segment_in_pic_flag | u(1) |
| if( nal_unit_type >= BLA_W_LP && nal_unit_type <= RSV_IRAP_VCL23 ) | |
|   no_output_of_prior_pics_flag | u(1) |
| slice_pic_parameter_set_id | ue(v) |
| ... | |
| if( slice_type == P || slice_type == B ) { | |
|   if( motion_vector_resolution_control_idc == 2) | |
|     slice_motion_vector_resolution_flag | u(1) |
|   num_ref_idx_active_override_flag | u(1) |
|   if( num_ref_idx_active_override_flag ) { | |
|     ... | |

Regarding the scaling mentioned above, this is something that can occur for example in HEVC (H. 265). The idea is that if a motion vector is used for coding some other frame, it can be computed what would be the motion vector that would be equivalent in terms of the relative positioning displacement between: (i) the current picture and (ii) its reference picture. This is based on the relative positioning of the displacement indicated by a motion vector in the co-located part of another picture, and based on the relative positioning displacement between (iii) that picture and (iv) the picture it was referencing as its reference picture. That is, the motion vectors themselves can be encoded based on prediction, with the motion vector for the target block in the current, target frame being encoded relative to a previous motion vector for a spatially corresponding block in a previous frame. The motion vector for the target block is then signalled in the encoded bitstream 33 only in terms of a difference (e.g. typically a delta) between the predicted version and the actual version. The decoder can then recreate the encoded motion vector by performing the same prediction at the decoder side and adding the delta.

However, the temporal frame rate of the coded data is not always constant, and also there may be a difference between the order in which pictures are coded in the bitstream and the order in which they are captured and displayed. These temporal relationships may be computed and then used to scale the motion vector so that it basically represents the same speed of motion in the same direction. I.e. the predicted version of the motion vector is not just equal to the reference vector, but rather is a scaled version of it. This is known as temporal motion vector prediction.

The current motion vector (MV) decoding process in the HEVC standard may be summarized as follows.
1. Determine how the MV is to be predicted at the decoder and whether or not a motion vector delta (MVD) has been sent in the encoded bitstream from the encoder (this may involve some syntax indications).
2. Generate the predicted motion vector (PMV). This creates a pair of integers (px, py). The integers are assumed to represent offsets with quarter sample position precision in the luma domain.
3. If no MVD is sent, set the MV value (mx, my) to (px, py); otherwise decode the pair of integers (px, py) as (dx, dy), and set the MV (mx, my) to (px+dx, py+dy). The MV is interpreted as representing ¼-sample offsets in the luma domain. Note: the luma distinction only matters if the video is in a format such as 4:2:2 or 4:2:0 which use different resolution in the luma channel than in the chroma channels; if instead the video is 4:4:4 format for example, the offset is interpreted as having ¼ sample units for all sampling grids, 4. Store the final value (mx, my) for subsequent use for generating subsequent PMVs (and controlling deblocking filtering, etc.).

In embodiments of the present disclosure, when the integer pixel motion vector mode is being used, the scaled motion vector may be rounded in the decoding process to accommodate the restriction to integer pixel resolution. For example motion vector decoding process may be modified as follows.

1. Determine how the MV is to be predicted at the decoder and whether or not a motion vector delta (MVD) has been sent in the encoded bitstream from the encoder (this may involve some syntax indications).
2. Generate the predicted motion vector (PMV). This creates a pair of integers (px, py). The integers are assumed to represent offsets with quarter sample position precision in the luma domain.
3. If operating in integer-precision mode, do this:
    a. Round off the prediction value to make it correspond to an integer offset—e.g. create (rx, ry)=(round (px/4), round (py/4)).
    b. If no MVD is sent, set the MV value (mx, my) to (4*rx, 4*ry); otherwise decode the pair of integers (px, py) as (dx, dy), and set the MV (mx, my) to (4*(rx+dx), 4*(ry+dy)). The MV is then interpreted as representing ¼-sample offsets in the luma domain (N.B. again the luma distinction only matters if the video is in a format such as 4:2:2 or 4:2:0).
4. Otherwise (i.e. when operating in ¼-sample precision mode), do this: If no MVD is sent, set the MV value (mx, my) to (px, py); otherwise decode the pair of integers (px, py) as (dx, dy), and the MV (mx, my) is set to (px+dx, py+dy). The MV is again interpreted as representing ¼-sample offsets in the luma domain.
5. Store the final value (mx, my) for subsequent use for generating subsequent PMVs (and controlling deblocking filtering, etc.).

However, the above process is not necessary for all possible embodiments. The approach outlined above assumes that the decoder operates in the ¼ pixel domain from the beginning such that the scaling in the motion vector prediction occurs in the ¼ pixel domain. However, in fact the decoder does not necessarily have to know what the units mean at this stage. Thus is it possible to take an alternative approach whereby no interpretation is placed on the units until later when used to actually generate the image.

The following describes a decoding process according to embodiments of such an alternative approach. As above, at least one of the motion vector values is differentially encoded, with the motion prediction module 73 being configured to predict the motion vector value by scaling another of said motion vector values. At least one of the motion vector values may be differentially encoded in terms of a delta value, and the motion prediction module 73 may be configured to predict the motion vector value by scaling another of said motion vector values to produce a scaled motion vector value, and then adding the delta value to the scaled motion vector value. However, unlike the above, the motion prediction module 73 is further configured to interpret the motion vector value in said integer pixel units (when the integer mode is being used) without rounding it to integer pixel resolution after the scaling. This is made possible by refraining from placing an interpretation on the units in the scaling. The motion prediction module 73 may be configured to interpret the motion vector value in said integer pixel units by performing the addition of the delta value to the scaled motion vector value without rounding the scaled motion vector value to integer pixel resolution. The resulting motion vector value is only interpreted in terms of integer or fractional pixel units when used to generate the image. The resulting value is also stored for use in predicting one or more subsequent motion vectors without placing an interpretation on the stored value in terms of either integer or fractional units.

For example according to such an alternative, the motion vector decoding process may be implemented as follows.

1. Determine how the MV will be predicted at the decoder and whether or not a motion vector delta (MVD) has been sent in the encoded bitstream from the encoder (this may involve some syntax indications).
2. Generate the predicted motion vector (PMV). This creates a pair of integers (px, py). However, don't worry about what this might represent—i.e. do not place any interpretation on the units at this stage.
3. If no MVD is sent, set the MV value (mx, my) to (px, py); otherwise decode the pair of integers (px, py) as (dx, dy), and set the MV (mx, my) to (px+dx, py+dy). If operating in integer-precision mode, interpret the MV as representing whole-integer offsets in the luma domain, i.e. as representing the value (4*mx, 4*my) in ¼-sample offset units. Otherwise (i.e. when operating in ¼-sample precision mode), interpret the MV as representing ¼-sample offsets in the luma domain, i.e. as representing the value (mx, my) in ¼-sample offset units (N.B. again the luma distinction only matters if the video is in a format such as 4:2:2 or 4:2:0).
4. Store the final value (mx, my) for subsequent use for generating subsequent PMVs (and controlling deblocking filtering, etc.). Again, don't worry about what this might represent.

Thus that the rounding step 3a described earlier is now eliminated. Only the interpretation of the numbers is modified. This makes the decoding process less complex, because no modification of the MV prediction process is necessary.

Notre that the rounding discussed above refers to the rounding from ¼ (or fractional) resolution to integer resolution. In present standards there is also a rounding from an even finer precision to the ¼ resolution as part of the motion vector prediction—and in the alternative embodiment above it is not excluded that such a preliminary rounding is still present.

There may be some side effects of operating in this manner. One side effect may be that if some pictures use a different mode than others, the scaling used in the MV prediction process for temporal MV prediction won't be correct. However, this would be a very minor effect-especially since it would be rare to have this situation of operating in different modes, and also because temporal MV prediction ordinarily only has a very minor benefit. Another side effect may be that the results of the deblocking filter control may depend on MV values that are interpreted at a different scale factor. However this effect would also be minor, especially since deblocking might be disabled or may not have much of an effect when coding screen content.

Another possibility would be to disable temporal motion vector prediction whenever using integer motion only. There is already syntax in HEVC that lets the encoder disable the use of that feature. That would be a possible way to avoid needing the decoder to have a special process that operates differently depending on whether the differences are coded as integers or as fractional values. The gain obtained from temporal motion vector prediction may be small (or zero) in these usage cases anyway, so disabling it need not be undesirable.

It will be appreciated that the above embodiments have been described only by way of example.

For instance, while the above has been described in terms of blocks, this does not necessarily limit to the divisions called blocks in any particular standard. For example the blocks referred to herein may be the divisions called blocks or macroblocks in the H.26x standards.

The scope of the disclosure limited to any particular codec or standard and in general the techniques disclosed herein can be implemented either in the context of an existing standard or an update to an existing standard, whether an H.26x standard like H264 or H.265 or any another standard, or may be implemented in a bespoke codec. Further, the scope of the disclosure is not restricted specifically to any particular representation of video samples whether in terms of RGB, YUV or otherwise. Nor is the scope limited to any particular quantization, nor to a DCT transform. E.g. an alternative transform such as a Karhunen-LoeveTransform (KLT) could be used, or no transform may be used. Further, the disclosure is not limited to VoIP communications or communications over any particular kind of network, but could be used in any network or medium capable of communicating data.

Where it is said that the motion vector offset is restricted or not restricted to an integer number of pixels, or the like, this may refer to the motion estimation in any one or two of the colour space channels, or the motion estimation in all three colour channels.

Further, the invention is not limited to selecting between integer pixel and quarter pixel resolution. In general the techniques described herein can be applied to selecting between integer pixel resolution and any fractional pixel resolution, e.g. ½ pixel resolution; or selecting between integer pixel resolution and a plurality of different fractional pixel modes, e.g. selecting between integer, ½ and ¼ pixel modes.

Further, the scope of the disclosure is not limited to an application in which the encoded video and/or screen capture stream is transmitted over a network, nor in which the streams are live stream. For example in another application, the stream may be stored on a storage device such as an optical disk, hard drive or other magnetic storage, or "flash" memory stick or other electronic memory. Note therefore that a screen sharing stream does not necessarily have to mean live sharing (though that is certainly one option). Alternatively or additionally it could be stored for sharing with one or more other users later, or the captured image data may not be shared but rather just recorded for the user who was using the screen at the time. Generally the screen capture could be any moving image data consisting of captured encoder-side screen content, captured by any suitable means (not necessarily by reading from the screen buffer, though that is one option), to be shared with one or more other users (live or not) or simply recorded for the benefit of the capturing user or for just for archive (perhaps never to actually be viewed again as it may turn out).

Note also that the codec is not necessarily limited to encoding only screen capture data and video. In embodiments it may also be capable of encoding other types of moving image data, e.g. an animation. Such other types of moving image data may be encoded in the fractional pixel mode or integer pixel mode.

Further, note that inter frame encoding does not necessarily always have to encode relative to a previous frame, but more generally some codecs may allow encoding relative to a different frame other than the target frame, either preceding or ahead of the target frame (assuming a suitable outgoing buffer).

Further, as discussed previously, note that motion vectors themselves may be encoded differentially. In this case where it is said that the motion vector as signalled in the encoded bitstream is restricted to an integer number of pixels, or the like, this means a differentially encoded form of the motion vector is so restricted (e.g. the delta).

Further, the decoder does not necessarily have to be implemented at an end user terminal, nor output the moving image data for immediate consumption at the receiving terminal. In alternative implementations, the receiving terminal may be an intermediate terminal such as a server running the decoder software, for outputting moving image data to another terminal in decoded or transcoded form, or storing the decoded data for later consumption. Similarly the encoder does not have to be implemented at an end-user terminal, nor encode moving image data originating from the transmitting terminal. In other embodiments the transmitting terminal may for example be an intermediate terminal such as a server running the encoder software, for receiving moving image data in unencoded or alternatively-coded form from another terminal and encoding or transcoding that data for storage at the server or forwarding to a receiving terminal.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the terminals may include an entity (e.g. software) that causes hardware of the user terminals to perform operations, e.g., processors functional blocks, and so on. For example, the terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more non-transitory computer-readable media having stored thereon computer-executable instructions for causing one or more processing units, when programmed thereby, to perform operations comprising:
   receiving encoded data, as part of a bitstream, for at least part of a video sequence, the encoded data including:
      an indicator, encoded in a header at a first level of bitstream syntax, the indicator indicating (a) whether or not motion vector ("MV") precision is controlled at a second level of bitstream syntax lower than the first level of bitstream syntax, and (b) if the MV precision is not controlled at the second level of bitstream syntax, whether the MV precision, being controlled at the first level of bitstream syntax, is an integer-sample precision or a fractional-sample precision for the video sequence, wherein the first level of bitstream syntax is sequence level, and wherein the second level of bitstream syntax is frame level or slice level, the indicator having one of three possible values, the three possible values including:
         a first possible value indicating that the MV precision is not controlled at the second level of bitstream syntax and that the MV precision, being controlled at the first level of bitstream syntax, is the fractional-sample precision;
         a second possible value indicating that the MV precision is not controlled at the second level of bitstream syntax and that the MV precision, being controlled at the first level of bitstream syntax, is the integer-sample precision; and
         a third possible value indicating that the MV precision is controlled at the second level of bitstream syntax; and
      if the MV precision is controlled at the second level of bitstream syntax, for each of multiple frames or regions of the video sequence, a flag for the frame or region in a header at the second level of bitstream syntax for the frame or region, the flag indicating for the frame or region whether the MV precision is the integer-sample precision or the fractional-sample precision; and
   decoding the encoded data, wherein the decoding includes:
      determining the indicator using the header at the first level of bitstream syntax, wherein the determining the indicator uses two bits from the header at the first level of bitstream syntax;
      based on the indicator, determining whether or not the MV precision is controlled at the second level of bitstream syntax;
      if the MV precision is not controlled at the second level of bitstream syntax, for the multiple frames or regions, respectively, determining, based on the indicator, whether the MV precision for the multiple frames or regions, respectively, is the integer-sample precision or the fractional-sample precision; and
      if the MV precision is controlled at the second level of bitstream syntax, for each of the multiple frames or regions, determining, based on the flag for the frame or region in the header at the second level of bitstream syntax for the frame or region, whether the MV precision for the frame or region is the integer-sample precision or the fractional-sample precision.

2. The one or more computer-readable media of claim 1, wherein the second level of bitstream syntax is frame level.

3. The one or more computer-readable media of claim 1, wherein the header at the first level of bitstream syntax is a sequence header, and wherein the header at the second level of bitstream syntax is a frame header.

4. The one or more computer-readable media of claim 1, wherein the second level of bitstream syntax is slice level.

5. The one or more computer-readable media of claim 1, wherein the header at the first level of bitstream syntax is a sequence parameter set, and wherein the header at the second level of bitstream syntax is a slice header.

6. The one or more computer-readable media of claim 1, wherein the fractional-sample precision is a quarter-sample precision.

7. The one or more computer-readable media of claim 1, wherein the MV precision indicated by the indicator or the flag is for horizontal components of MV values or vertical components of the MV values, the operations further comprising, during the decoding, resizing at least one of the frames horizontally or vertically.

8. The one or more computer-readable media of claim 7, wherein the horizontal components of the MV values and the vertical components of the MV values have different MV precisions.

9. The one or more computer-readable media of claim 1, wherein the decoding further includes, for MV values of a given frame or region among the multiple frames or regions:
   if the MV precision for the given frame or region is the integer-sample precision, interpreting the MV values in units of integer samples; and
   if the MV precision for the given frame or region is the fractional-sample precision, interpreting the MV values in units of fractional samples.

10. The one or more computer-readable media of claim 1, wherein, for a given frame or region among the multiple frames or regions, if the flag for the given frame or region is not present in the bitstream, the flag for the given frame or region is inferred to have a value equal to the indicator.

11. The one or more computer-readable media of claim 1, wherein the determining the indicator includes entropy decoding an entropy-coded two-bit value from the header at the first level of bitstream syntax.

12. One or more non-transitory computer-readable media having stored thereon computer-executable instructions for causing a computer system, when programmed thereby, to perform encoding operations to produce encoded data, as part of a bitstream, for at least part of a video sequence, the encoded data including:
   an indicator, encoded in a header at a first level of bitstream syntax, the indicator indicating (a) whether or not motion vector ("MV") precision is controlled at a second level of bitstream syntax lower than the first level of bitstream syntax, and (b) if the MV precision is not controlled at the second level of bitstream syntax, whether the MV precision, being controlled at the first level of bitstream syntax, is an integer-sample precision or a fractional-sample precision for the video sequence, wherein the first level of bitstream syntax is sequence level, and wherein the second level of bitstream syntax is frame level or slice level, the indicator having one of three possible values, the three possible values including:

a first possible value indicating that the MV precision is not controlled at the second level of bitstream syntax and that the MV precision, being controlled at the first level of bitstream syntax, is the fractional-sample precision;

a second possible value indicating that the MV precision is not controlled at the second level of bitstream syntax and that the MV precision, being controlled at the first level of bitstream syntax, is the integer-sample precision; and a third possible value indicating that the MV precision is controlled at the second level of bitstream syntax; and if the MV precision is controlled at the second level of bitstream syntax, for each of multiple frames or regions of the video sequence, a flag for the frame or region in a header at the second level of bitstream syntax for the frame or region, the flag indicating for the frame or region whether the MV precision is the integer-sample precision or the fractional-sample precision;

wherein the encoded data is produced by encoding of the at least part of the video sequence according to the encoding operations, and wherein the encoding operations include:

encoding the indicator in the header at the first level of bitstream syntax, wherein the encoding the indicator uses two bits in the header at the first level of bitstream syntax; and if the MV precision is controlled at the second level of bitstream syntax, for each the multiple frames or regions of the video sequence:

determining whether the MV precision for the frame or region is the integer-sample precision or the fractional-sample precision; and setting the flag for the frame or region in the header at the second level of bitstream syntax for the frame or region.

13. The one or more computer-readable media of claim 12, wherein the header at the first level of bitstream syntax is a sequence header, and wherein the header at the second level of bitstream syntax is a frame header.

14. The one or more computer-readable media of claim 12, wherein the header at the first level of bitstream syntax is a sequence parameter set, and wherein the header at the second level of bitstream syntax is a slice header.

15. In a computer system that implements a video encoder, a method comprising:

encoding at least part of a video sequence, thereby producing encoded data, as part of a bitstream, for the at least part of the video sequence, the bitstream having a first level of bitstream syntax and a second level of bitstream syntax lower than the first level of bitstream syntax, wherein the encoding the at least part of the video sequence includes:

encoding an indicator in a header at the first level of bitstream syntax, wherein the encoding the indicator uses two bits in the header at the first level of bitstream syntax, the indicator indicating (a) whether or not motion vector ("MV") precision is controlled at the second level of bitstream syntax, and (b) if the MV precision is not controlled at the second level of bitstream syntax, whether the MV precision, being controlled at the first level of bitstream syntax, is an integer-sample precision or a fractional-sample precision for the video sequence, wherein the first level of bitstream syntax is sequence level, and wherein the second level of bitstream syntax is frame level or slice level, the indicator having one of three possible values, the three possible values including:

a first possible value indicating that the MV precision is not controlled at the second level of bitstream syntax and that the MV precision, being controlled at the first level of bitstream syntax, is the fractional-sample precision;

a second possible value indicating that the MV precision is not controlled at the second level of bitstream syntax and that the MV precision, being controlled at the first level of bitstream syntax, is the integer-sample precision; and a third possible value indicating that the MV precision is controlled at the second level of bitstream syntax; and if the MV precision is controlled at the second level of bitstream syntax, for each multiple frames or regions of the video sequence:

determining whether the MV precision for the frame or region is the integer-sample precision or the fractional-sample precision; and setting a flag for the frame or region in a header at the second level of bitstream syntax for the frame or region, the flag indicating whether the MV precision for the frame or region is the integer-sample precision or the fractional-sample precision; and outputting the encoded data, as part of the bitstream, the encoded data including:

the indicator, encoded in the header at the first level of bitstream syntax; and if the MV precision is controlled at the second level of bitstream syntax, for each of the multiple frames or regions, the flag for the frame or region in the header at the second level of bitstream syntax for the frame or region.

16. The method of claim 15, wherein the encoding the indicator includes entropy coding a two-bit value for the header at the first level of bitstream syntax.

17. The method of claim 15, wherein the frames have a content type, wherein the MV precision is the integer-sample precision if the content type is a screen capture content type, and wherein the MV precision is the fractional-sample precision if the content type is a camera video content type.

* * * * *